Dec. 11, 1956 W. C. SANDOR 2,773,543
COUPLING CONNECTION FOR WIRE SPRING STRUCTURES
Filed Feb. 15, 1954 3 Sheets-Sheet 1
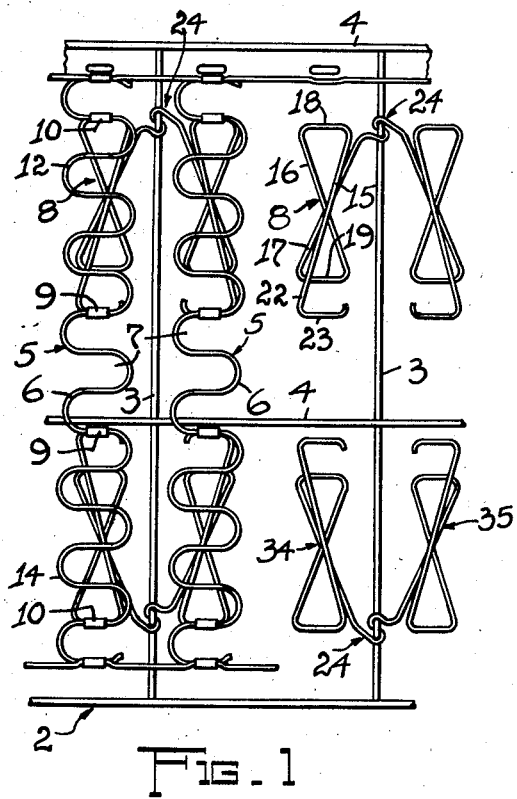
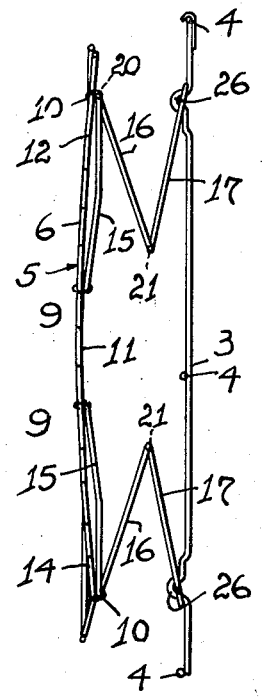
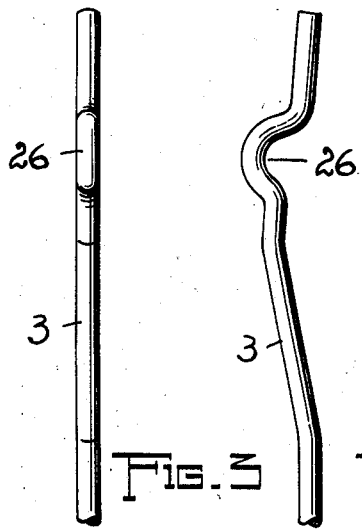
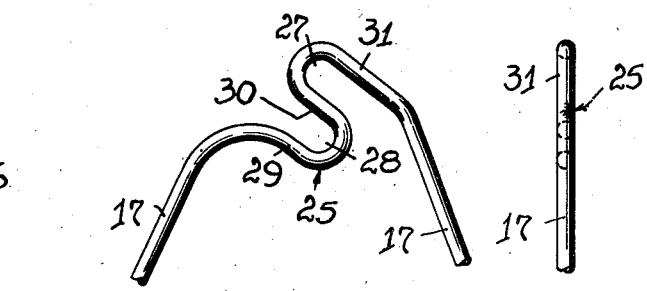
INVENTOR.
WILLIAM.C.SANDOR
BY
ATT.

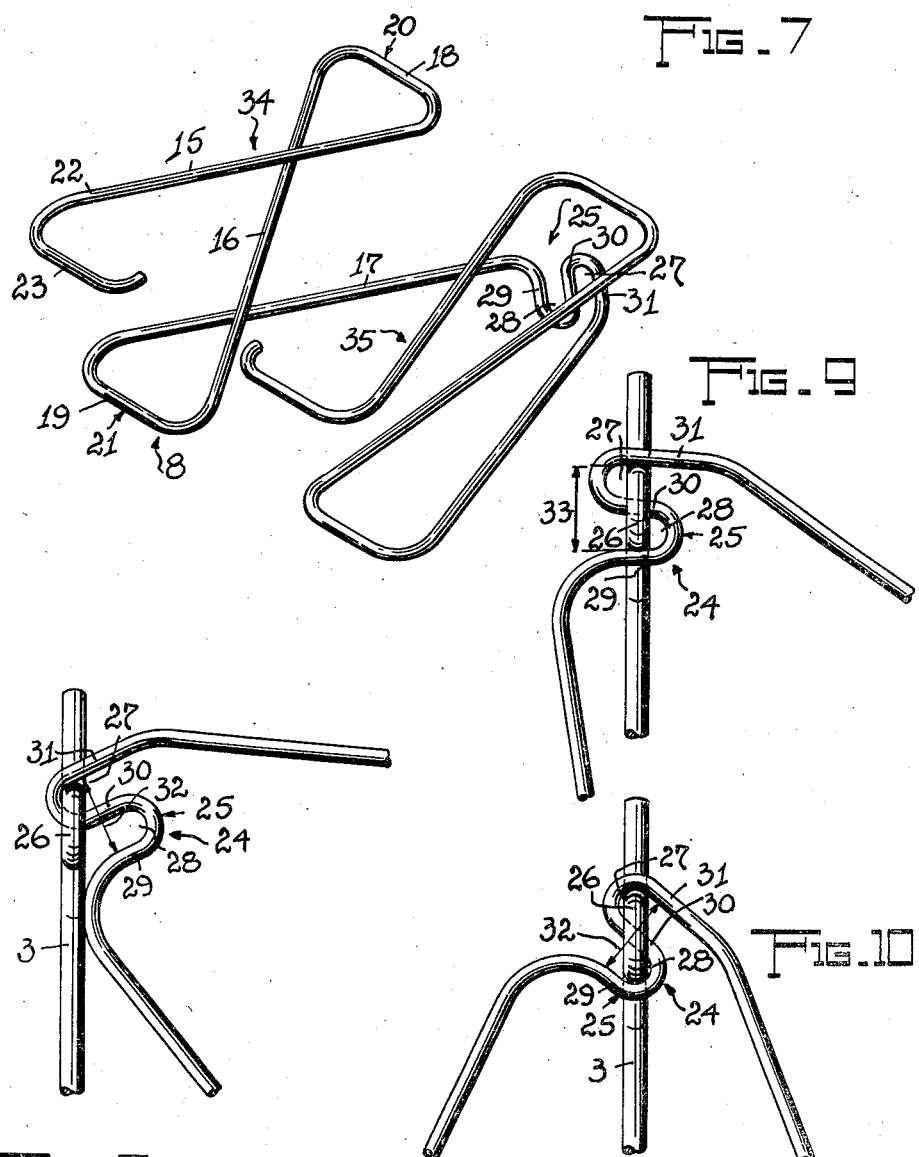

Dec. 11, 1956 W. C. SANDOR 2,773,543
COUPLING CONNECTION FOR WIRE SPRING STRUCTURES
Filed Feb. 15, 1954 3 Sheets-Sheet 3

INVENTOR.
WILLIAM C. SANDOR
BY
ATT.

__United States Patent Office__

2,773,543
Patented Dec. 11, 1956

2,773,543
COUPLING CONNECTION FOR WIRE SPRING STRUCTURES

William C. Sandor, Solon, Ohio, assignor to The Universal Wire Spring Company, Bedford, Ohio, a corporation of Ohio Application February 15, 1954, Serial No. 410,102

7 Claims. (Cl. 155—179)

This invention relates to wire spring cushion and seat assemblies for upholstered furniture, cushioned automobile seats, backs or the like in which a plurality of elongated, zigzag-shaped wire springs are mounted on skeleton or frame structures. In these wire spring cushion and seat assemblies the wire springs which generally embody crowned seating portions mounted on yielding supporting means have such supporting means attached to frame structures embodying rails with specific attachment means to permit removable mounting of the supporting means on the frame structures. Such specific construction of frame structures, however, is costly in material and labor and, in addition, increases assembly cost of such wire spring assemblies, as mounting of wire springs on specific frame structures is generally slow and expensive.

The primary object of the present invention is the provision of an improved, simplified wire spring cushion and seat assembly of the general type referred to above constructed to include a simple frame structure in which the wire cross members are formed between their opposite ends with localized open loop configurations and a plurality of wire springs in which the seating surfaces are supported by yielding supporting means formed in localized areas with S-shaped configurations, in which wire spring assembly the open loop configurations of the frame cross members are removably, non-rotatably interengaged with the S-shaped configurations of the yielding supporting means for the seating surfaces and thus removably, non-rotatably connect the wire springs to the frame structure of the wire spring cushion and seat assembly.

Such a general object of the invention is attained by providing wire cross members of the frame structure of a wire spring cushion and seat assembly in predetermined localized areas with sharply upwardly curved open loops shaping the supporting means of wire springs to be mounted on the frame structure in predetermined localized areas with S-shaped configurations having their longitudinal axes angularly related to the longitudinal axis of the supporting means, engaging the sharply curved open loops in said wire cross members with the loops of the S-shaped configurations in the respective supporting means and rotating the thus interengaged supporting means and cross members with respect to each other to releasably lock same rigidly to each other.

Another object of the invention, therefore, is the provision of a releasable locking engagement between two differently constructed wire elements, in which arrangement the one element forms part of a frame structure and the other element supporting means for a wire spring, the one element including in a localized area a sharply curved open loop and the other element a sharply curved S-shaped configuration having its longitudinal axis angularly related to the longitudinal axis of such element to releasably interengage the elements and lock same to each other when rotated with respect to each other.

With the above and other objects in view, the invention has certain other marked superiorities which clearly distinguish it from presently known structures and arrangements of this type. These improvements or characteristics, embodying certain novel features of construction and design, are clearly set forth in the appended claims, and the preferred form of embodiment of the invention used in combination with a wire spring seat structure is hereinafter shown with reference to the accompanying drawings forming part of the specification.

In the drawings:

Fig. 1 is a fragmentary plan view of a wire frame including specifically constructed wire cross members and specifically constructed wire springs assembled from N-shaped yielding supporting elements and sinuously corrugated wire strips, the wire cross members seating the N-shaped supporting elements of the wire springs and, in accordance with the invention, detachably and non-rotatably mounting such elements;

Fig. 2 is a side view of Fig. 1;

Fig. 3 is an enlarged plan view of a fragmentary portion of a wire cross member of the wire frame structure shown in Fig. 1;

Fig. 4 is a side view of Fig. 3;

Fig. 5 is an enlarged plan view of a fragmentary portion of an N-shaped wire supporting element;

Fig. 6 is a side view of Fig. 5;

Fig. 7 is an enlarged perspective view of the N-shaped wire strip supporting element;

Figure 11:
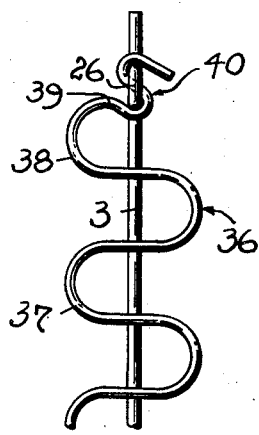
Figure 12:
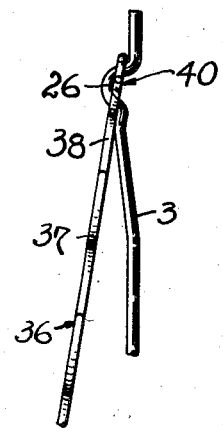
Figure 13:
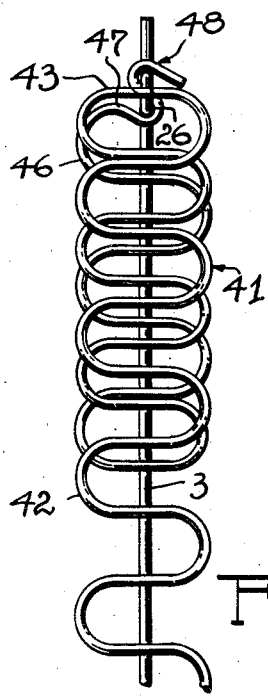
Figure 14:
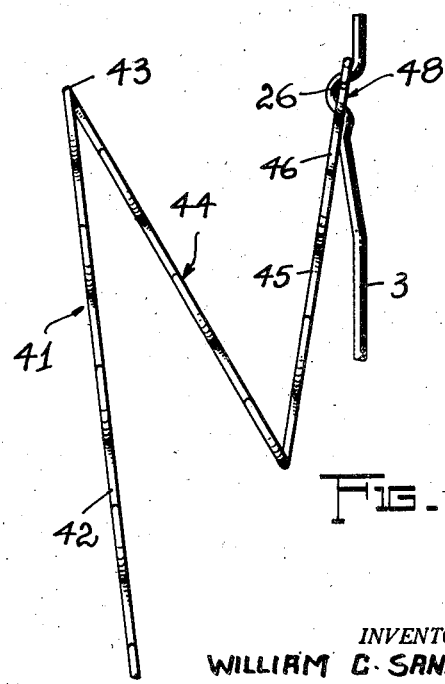

Figs. 8 through 10 are fragmentary plan views of the different positions of a wire cross member and an N-shaped wire supporting element engaged with the wire cross member and rotated with respect thereto to detachably, non-rotatably interlock therewith; thus Fig. 8 is a plan view showing the sharply curved loop of a wire cross member hookingly engaged with the S-shaped configuration of an N-shaped wire supporting element;

Fig. 9 is a plan view similar to Fig. 8, with the N-shaped wire element rotated so as to partly interlock with the loop of the wire cross member; and Fig. 10 is a plan view similar to Figs. 8 and 9, with the N-shaped wire element rotated to fully interlock with the loop of the wire cross member;

Fig. 11 is a fragmentary plan view of a wire structure in which a wire frame including specifically constructed wire cross member means has directly detachably and non-rotatably mounted thereon sinuously corrugated wire spring means;

Fig. 12 is a side view of Fig. 11;

Fig. 13 is a fragmentary plan view similar to Fig. 11, with the exception that the sinuously corrugated wire spring means include V-shaped, sinuously corrugated supporting arm means which are directly detachably and non-rotatably mounted on the wire frame;

Fig. 14 is a side view of Fig. 13.

Referring now more particularly to the exemplified form of the invention, which may readily be used in connection with different types of wires and wire springs, frame structure 2 embodies a plurality of preferably parallelly arranged, spaced straight wire cross members 3 and a plurality of parallelly arranged, spaced wire stringers 4 extended over cross wires 3 and welded thereto at the contact points therewith. Wire frame structure 2 has mounted thereon a plurality of elongated wire springs 5 which extend parallel to wire cross members 3 and are coupled therewith. Each of these wire springs which are elongated embodies a sinuously corrugated top wire strip 6 of steel wire bent to sinuous shape to extend its loops 7 substantially parallel to each other and N-shaped wire supporting elements 8 secured by sheet metal clips 9 and 10 to the bottom face of the top wire strip near its opposite ends 12 and 14. The N-shaped wire supporting elements 8 are formed from straight wire bent to N-shape in such a fashion that each of these elements includes three elongated straight wire arms 15, 16 and 17 arranged in laterally offset angular relation with respect to each other and connected with each other by short straight wire portions 18 and 19 providing such element with sharp-edged apexes 20 and 21. The wire arm 15 includes at its free end 22 a short lateral extension 23 which extends parallel to short straight wire portion 18 of element 8. This lateral extension and short wire portion 18 of N-shaped supporting element 8 are coupled by sheet metal clips 9 and 10 to bottom face 11 of top wire strip 6.

The wire springs 5 are removably mounted on wire frame structure 2 by coupling connections 24 formed by interlocking engagement of S-shaped configurations 25 in arms 17 of N-shaped supporting elements 8 and sharply curved, upwardly extended open loops 26 in wire cross members 3. Each S-shaped configuration has extended from its two symmetrically arranged loops 27 and 28 three parallelly arranged straight wire cross members 29, 30 and 31 and in coupling operations has loop 27 hooked to a sharply curved open loop 26 in a wire cross member 3 of frame structure 2 in such a fashion that wire cross member 3 of S-shaped configuration 25 is extended through open loop 26 below such cross member 3 and that cross members 29 and 31 are extended adjacent to open loop 26 above the cross member 3.

Proper operation and coupling action of coupling connection 24 is controlled by the size of cooperating loops 26, 27 and 28 and the gage of the wire used for shaping the cross members 3 and the S-shaped configurations 25. The loops 26, 27 and 28 must be dimensioned to effect in coupling operations contact with each other in at least three areas positioned in two or more planes and, furthermore, must effect with a snap-like action the locking of coupling connection 24. This snap-like locking action will readily be observed by inspection of Figs. 8, 9 and 10 in which arrow 32 (see Figs. 8 and 10) defining the distance between parallel cross members 29 and 31 is shorter than arrow 33 (see Fig. 9) which defines the medium distance between the cross members 29 and 31 when S-shaped configuration in coupling operations is rotated from Fig. 8 position to Fig. 9 position and hence to Fig. 10 position.

Supporting elements 8, as described above, for reasons of simplicity have been associated only with a single sinuously corrugated wire strip, though, as shown in the drawings, these wire strip supporting elements include two symmetrically arranged supporting portions 34, 35 (see Fig. 7) supporting the top wire strips of two adjoining wire springs and having S-shaped configurations arranged substantially symmetrically between the supporting portions 34, 35.

The modified structure fragmentarily shown in Figs. 11 and 12 is similar to the form of the invention disclosed in Figs. 1 through 10, with the exception that spring means 36 consists of a sinuously corrugated wire strip 37 which terminates at its end 38 in a wire crossbar 39 and has integrally extended therefrom an S-shaped configuration 40 arranged in interlocking arrangement with sharply curved, upwardly extended open loop 26 of wire cross member 3.

The modified structure fragmentarily shown in Figs. 13 and 14 is also similar to the form of the invention disclosed in Figs. 1 through 10, with the exception that spring means 41 consists of a sinuously corrugated wire strip 42 formed at its end 43 with a V-shaped, sinuously corrugated supporting arm 44. The lower arm portion 45 of supporting arm 44 is at the free end 46 provided with a wire cross bar 47 and has integrally extended therefrom an S-shaped configuration 48 arranged in interlocking engagement with sharply curved, upwardly extended open loop 26 of wire cross member 3.

Having thus described my invention, what I claim is:

1. In a wire spring structure two elongated wire members removably, non-rotatably coupled with each other, a sharply curved open loop in one of said wire members, and an S-shaped loop in the other one of said wire members, said S-shaped loop including three substantially parallelly arranged cross-bars the other ones of which are spaced from each other a distance less than the outside diameter of the sharply curved open loop in said one wire member, said S-shaped loop having the cross-bar between said two outer cross-bars extended through said sharply curved open loop in said one wire member and yieldingly hugging with said two outer cross-bars the outside wall of said open loop.

2. In a wire spring structure, two wires nonrotatably connected to each other, one of said wires including a single loop therein forming a pocket, the other one of said wires including a planar substantially S-shaped loop therein, said S-shaped loop being interengaged with the loop of said first wire by disposing the central portion of the S-shaped loop in said pocket and resiliently engaging the outer portions of said S-shaped loop with the outside of the loop of the first mentioned wire.

3. A wire spring structure including two wire elements removably coupled to each other, one element looped to form a pocket and the other element reversely looped to form a planar S-shaped configuration having a short central portion and spaced portions arranged substantially parallel to said central portion, said last mentioned element being coupled in over-center relationship with said first mentioned element by extending the said short central portion of said planar S-shaped configuration through said pocket and with the spaced portions thereof yieldingly engaging diametrically opposed outside portions of the loop forming said pocket.

4. In a wire spring structure a supporting member and a spring wire removably fixed to said supporting member, said supporting member including an open loop forming a pocket and said spring wire including a planar substantially S-shaped loop interlocked with said supporting member by disposing the central portion of the S-shaped loop in said pocket and hugging with the outer portions of said S-shaped loop the outside wall of the open loop of the supporting member.

5. In a wire spring structure two elongated wire members removably coupled with each other, one of said members including a sharply curved open loop, the other one of said wire members including an S-shaped configuration formed by two wire loop portions arranged in symmetrical relation with respect to each other and three substantially parallelly arranged straight wire portions, said S-shaped configuration hugging the outside of the sharply curved open loop in said first mentioned wire member at spaced points thereon with one of the three straight wire portions of the S-shaped configuration seated within the sharply curved open loop of such latter wire member in angular relation to the axis thereof.

6. In a wire spring structure two elongated wire members removably coupled with each other, one of said wire members including a sharply curved open loop, the other one of said wire members including a planar S-shaped configuration formed by two symmetrically arranged wire loop portions and three substantially parallel straight wire portions, the mediate one of said three straight wire portions being seated within said sharply curved open loop in angular relation to the axis thereof with the symmetrically arranged wire loop portions hugging the opposite side of the wire of said sharply curved open loop.

7. A wire spring structure as described in claim 6, wherein the wire loop portions of the planar S-shaped configuration are substantially identically dimensioned and have half-circular shape, and wherein the parallel straight wire portions of said S-shaped configuration are angularly related to the longitudinal axes of the two elongated wire members.

References Cited in the file of this patent

UNITED STATES PATENTS

| | | |
|---|---|---|
| 1,859,630 | Oldham | May 24, 1932 |
| 2,551,800 | Hopkes | May 8, 1951 |
| 2,643,705 | Neely | June 30, 1953 |
| 2,657,740 | Daniels et al. | Nov. 3, 1953 |
| 2,669,293 | Neely et al. | Feb. 16, 1954 |
| 2,673,598 | Grattan | Mar. 30, 1954 |
| 2,676,647 | Smith | Apr. 27, 1954 |
| 2,684,844 | Flint et al. | July 27, 1954 |